United States Patent [19]

Hanson et al.

[11] 4,373,887
[45] Feb. 15, 1983

[54] APPARATUS FOR PRODUCING POROUS SHAPED PRODUCTS

[75] Inventors: Timothy A. Hanson; David W. Smith, both of Ft. Collins, Colo.

[73] Assignee: Teledyne Industries, Inc., Ft. Collins, Colo.

[21] Appl. No.: 239,556

[22] Filed: Mar. 2, 1981

Related U.S. Application Data

[60] Continuation of Ser. No. 120,564, Feb. 11, 1980, abandoned, which is a division of Ser. No. 55,637, Jul. 9, 1979.

[51] Int. Cl.³ .............................................. A23G 1/70
[52] U.S. Cl. ................................. 425/143; 425/547; 425/574; 264/121; 406/144
[58] Field of Search .................. 425/547, 574, 143; 264/121; 406/144

[56] References Cited

U.S. PATENT DOCUMENTS

| | | | |
|---|---|---|---|
| 1,423,536 | 7/1922 | Moser | 406/144 |
| 3,048,537 | 8/1962 | Pall et al. | 264/126 |
| 3,099,045 | 7/1963 | Honkanen | 264/121 |
| 3,162,704 | 12/1964 | Attanasio et al. | 264/121 |
| 4,201,742 | 5/1980 | Hendry | 425/547 |

Primary Examiner—James R. Hall
Attorney, Agent, or Firm—Hugh H. Drake

[57] ABSTRACT

Apparatus for producing a porous plastic molded product of uniform, predictable porosity throughout. A fluidized airstream of moldable plastic powder is formed. Water may be injected into said fluidized powder airstream for maintaining said powder in a uniform, fluidized dispersion. The moisturized, fluidized, powder airstream is injected into a cavity of a closed mold to fill said mold cavity with said powder. The mold is maintained at a temperature and for a time sufficient to at least partially fuse said powder particles together without melting said particles, thereby to form a porous, plastic molded product. The mold is partially separated for cooling the product which is then discharged from the mold. The product may be further cured by heating the molded product in an oven at a temperature and for a time sufficient to cure said molded product without melting said plastic or glazing said product.

4 Claims, 6 Drawing Figures

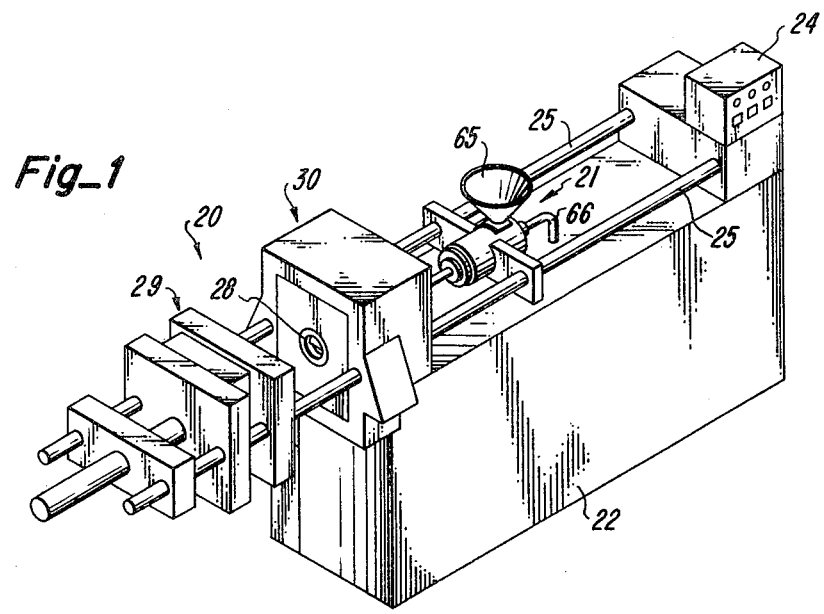
Fig_1
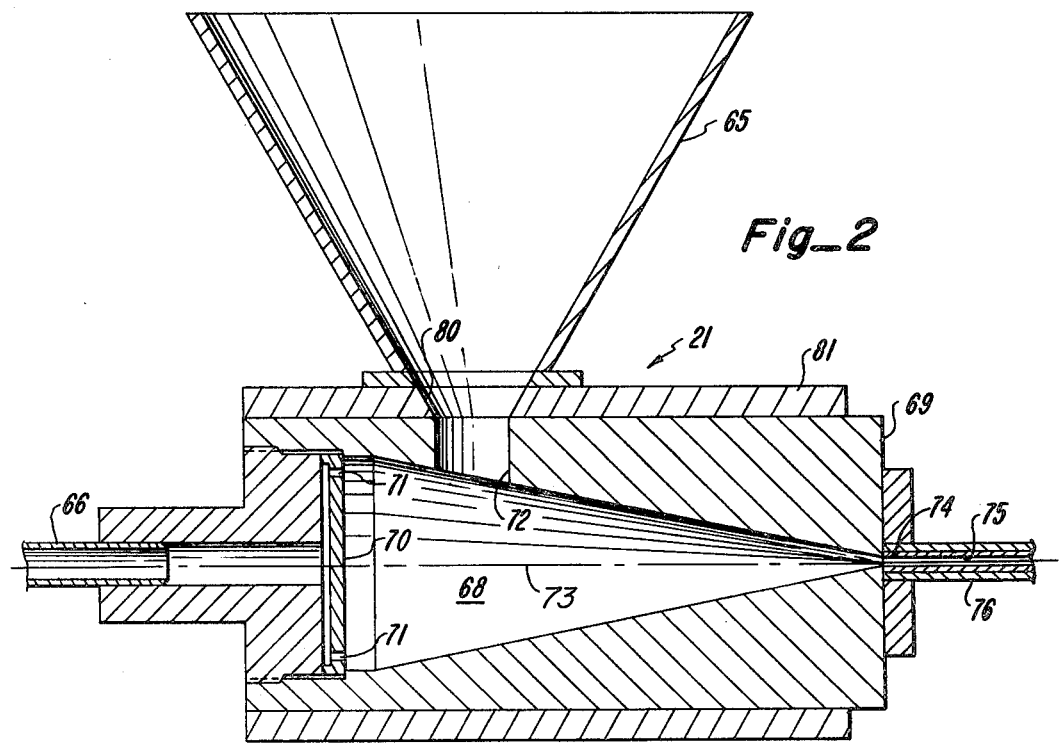
Fig_2

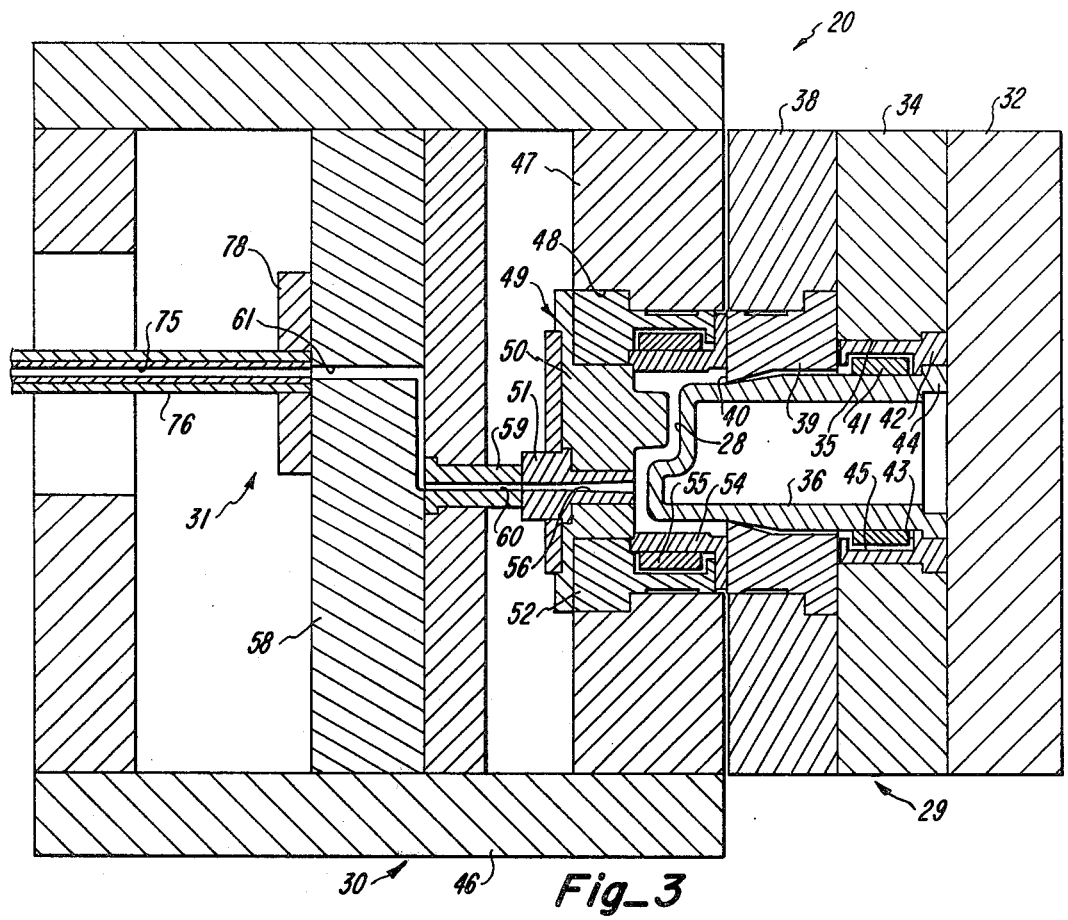
Fig_3
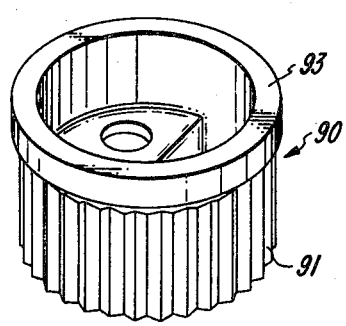
Fig_4
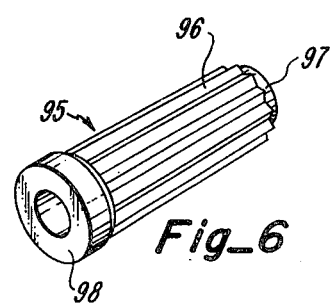
Fig_6
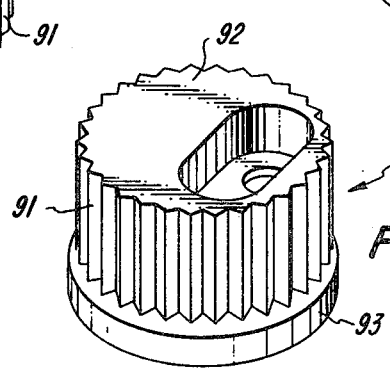
Fig_5

APPARATUS FOR PRODUCING POROUS SHAPED PRODUCTS

RELATED APPLICATION

This is a continuation of now-abandoned co-pending parent application Ser. No. 120,564, filed Feb. 11, 1980, which, in turn, is a division of its co-pending grandparent application Ser. No. 55,637, filed July 9, 1979.

BACKGROUND OF THE INVENTION

The present invention relates to an apparatus for producing porous, plastic, shaped objects from high molecular weight moldable polymers. More specifically, the present invention relates to an injection-molding type apparatus adapted to receive and shape powdered polymeric materials into porous plastic shaped articles, and to a method for producing porous shaped articles from polymeric materials. Illustrative articles formed of porous plastic bodies produced in accordance with the present invention find particular, but not necessarily exclusive, utility as filters and filter media. One such use is as a filter body for the treatment of water, particularly in conjunction with activated charcoal and like materials, to remove solids and other impurities which create undesirable tastes, odors and colors in drinking water. See, for example, the filter structure described in U.S. Pat. No. 4,151,092, filed July 11, 1977, by Thomas Grimm, et al. for "Portable Water Filter". Another illustrative use of such articles is for cigarette filters and similar filters for tobacco smoke. These filters may be readily formed of the shape and uniform porosity needed in filter tipped cigarettes or in filter inserts for cigarette holders. A wide variety of other uses and adaptions of the porous plastic shaped objects is possible, including filters for gases, oils, fuels, blood and plasma, aquarium and pool water, as well as for a wide variety of other industrial, commercial and household applications.

OBJECTS OF THE INVENTION

It is the principal object of the present invention to provide an apparatus for producing porous plastic shaped articles which have a uniform and predictable porosity.

Another object of the invention is to provide an improved apparatus for feeding plastic moldable powder to a heat controlled molding apparatus.

A further object of the invention is to provide an apparatus of the foregoing character which feeds a uniform quantity of molding powder to a heat controlled mold which in turn produces a molded product of controlled porosity.

Still another object is to provide a fluidized stream of molding powder in a manner permitting the powder to be injected into a heat controlled molding apparatus for producing porous products.

SUMMARY OF THE INVENTION

Apparatus for producing a porous, polymeric plastic shaped product embodied in the present invention, as described in more detail below, includes the steps of forming a fluidized stream of moldable plastic powder in a stream of pressurized gas, such as air, and injecting the fluidized powder into a cavity or cavities in a closed continuously heated mold. The mold includes gas vents of a size sufficient to allow the escape of the fluidizing gas but not of the fluidized powder solids. In this manner, the mold cavities are completely filled with the powder at a uniform density throughout. The mold is maintained at a temperature and for a time sufficient to fully or partially fuse or sinter the powder particles together without melting the particles, thereby forming a porous, plastic, shaped product. The mold is then partially separated, and the product is cooled and discharged from the mold. The product may be further heated or cured to produce the final accurately shaped product. For this last step, the partially cured article is placed on a shaped mandrel before the final cure in order to maintain and accurately control its shape.

DESCRIPTION OF THE DRAWINGS

FIG. 1 is a somewhat diagrammatic isometric view of a molding apparatus embodying the present invention.

FIG. 2 is a vertical section view through a fluidizing mechanism for forming a fluidized stream of molding powder and injecting the same into a mold apparatus.

FIG. 3 is a vertical section view through a mold apparatus embodying the present invention.

FIG. 4 is a top isometric view of a water filter element produced by the apparatus shown in FIG. 1 and mold shown in FIG. 3.

FIG. 5 is a bottom isometric view of the water filter element shown in FIG. 4.

FIG. 6 is an enlarged isometric view of a cigarette filter produced in accordance with the present invention.

DESCRIPTION OF THE PREFERRED EMBODIMENT

Apparatus for Molding Porous Shaped Bodies

The apparatus of the present invention comprises means of injecting a finely divided, fluidized, polymeric plastic, powder material into a closed, continuously heated mold by means of a stream of pressurized air or other carrier gas. The material is delivered from a fluidized powder injection apparatus incorporating an injection nozzle for directing the fluidized powder into the mold. The powder is fluidized or suspended in a pressurized gas stream, sufficient moisture is injected to maintain the powder particles in a uniform distribution, and the mixture is directed into a mold cavity which is continuously heated and maintained at a constant temperature. The polymeric plastic powder material is retained in the heated mold cavity, and the air or injection gas escapes through minute gas passages in the mold structure, which passages are sized to preclude flow of the powder particles. When the mold cavities are full, the injection stops automatically.

Utilizing a fluidized moldable powder having a defined particle size range and moisture content, the mold cavity is filled to capacity uniformly throughout its volume without packing or channeling, thereby resulting in a product of an even, uniform density throughout. The injection of the powder into the mold is self-terminating, ceasing when the mold cavity is filled with powder. After injection, the polymeric plastic material is allowed to remain in the mold cavity at a temperature and for a time sufficient to fully or partially cure and form the shaped porous product. The time of cure and the temperature of cure preferably are adjusted to a level just sufficient to sinter the material into the desired shaped, porous product. Of course, the temperature is insufficient to melt and fuse the powder into a non-porous mass.

When the shaped product has been fully or partially cured, the mold is partially opened and a blast of coolant, such as cold air, is directed toward the molded part to reduce its temperature and stabilize the material. The molded part is then ejected and the cycle is repeated. When the molded product is only partially cured in the mold, it is subsequently fully cured in an oven or other suitable heating unit for this purpose. The partially cured units are placed on a mandrel or form to provide for a final, accurate shaping of the product.

The molded part thus produced is composed of partially fused or sintered particles of high molecular weight polymeric plastic, and it presents an accurately shaped body having a repeatedly uniform porosity throughout. The cure cycle time is determined by the cure temperature of the material being used and by the wall section thicknesses of the part being molded. By maintaining the cure cycle, temperature, plastic particle composition and particle size and fluidizing gas pressure constant, a highly repeatable product density and porosity can be maintained.

The forming mold itself is heated in any appropriate manner, as will be described in more detail below. It has been observed that electric heat, applied through heating bands and cartridges, provides an extremely effective and economical heat source. Oil or other heating fluids may likewise be utilized.

The curing or baking oven is maintained at a temperature sufficient to fully cure the molded parts without melting the parts or forming a glaze on their surfaces. It has been observed that the temperature of the oven should be maintained at a level sufficient to partially cure or set the molded product. The time of baking will depend on both the polymer utilized and the physical configuration of the molded parts, and it will generally extend for about 40 to about 80 minutes. Properly done, the baking will have no appreciable effect on the porosity of the molded parts. While overbaking will melt the polymer particles together and glaze the exterior surfaces, or underbaking or curing will result in physical weaknesses, there is a wide range of time and temperatures which will produce products of acceptable porosity and strength.

Polymeric Molding Materials

A variety of polymeric high molecular weight plastic molding materials can be utilized in connection with the present invention depending upon the properties and characteristics desired in the product to be produced. One molding powder material finding utility in the method of the present invention is an ultra-high molecular weight, high density polyethylene polymer produced by the Ziegler low-pressure polymerization process. An illustrative commercial polymeric powder having the desired characteristics is sold under the trademark "Hostalen", by American Hoechst Corporation, Summerville, N.J. While the foregoing Hostalen polymer is primarily produced for filming purposes, it has been found that it is admirably suited for the low-pressure, low-continuous-temperature, molding polymeric plastic shaped objects having the desired rigidity and porosity characteristics. Measured by the light scattering method, the mean molecular weight of the moldable polymer is in the region of 3.5 to $4 \times 10^6$. The high molecular weight polymer results in a high viscosity in solution and a pronounced viscoelastic melt behavior. The polymer has a crystallite melting point of 135°–138° C. and a specific gravity of 0.94. The material has a thermal stability, under a 66 psi load, of 95° C. and a mean coefficient of linear thermal expansion of $2 \times 10^{-4}$ cm/cm/°C. (at 20° C.–100° C.). The polymer is utilized in a finely divided powder form having a U.S. screen size from about 80 to about 230 (180 microns to 60 microns) and preferably a screen size of about 100 to about 200 (150 microns to 75 microns) as in "Hostalen" Gur 413. Moreover, it is to be noted that the particle size selected within an operable range enables a degree of controllable variation in the porosity of the ultimate filter. Molding to a definite shape is achieved in about one-half to three minutes when using conventionally designed mold components. Using the preferred material, a pore size of about twenty-five microns is obtained in the finished product.

It has been observed that the presence of extremely small screen size particles or fines near and above the 230 size results in a loss of or irregular permeability. For this reason, it is desirable that the powder be carefully prepared or screened to remove the fines in order to provide the desired particle screen size range of about 100 to about 200. It has further been observed that the addition of moisture to the airborne powder serves to keep the particles evenly distributed in the mold and results in a more uniform porosity.

Molding Apparatus

The molding process described above may be performed on any appropriate molding apparatus equipped with molds and a powder injection system capable of producing the desired results. In accordance with a further aspect of the present invention, a molding apparatus and powder injection system has been developed which, when utilized with the above process, produces porous plastic molded products of uniform, predictable porosity and of the desired shape and configuration.

Referring to the drawings, the molding apparatus embodying the present invention comprises a mold assembly 20 and a molding powder injection assembly 21, both supported on a base 22 which includes the necessary mechanisms for opening and closing the mold assembly 20 and actuating the powder injection assembly 21. Appropriate sequential controls are provided in a control housing 24 for controlling and operating the molding cycle.

The components of the mold assembly 20 and powder injection assembly 21 are mounted on guide rails 25. Power cylinders (not shown) or other motive devices are provided for positioning the movable components of the mold assembly 20 relative to the stationary components and for positioning the molding powder injection structure 21 relative to the mold components.

For receiving molding powder to produce a molded product, one or more mold cavities 28 are defined by a pair of opposed cooperating mold sections 29, 30, one section 29 of which is adapted for movement relative to the other section 30. The powder injection assembly 21 is associated with a movable runner and nozzle section 31 slidably associated with the relatively stationary section 30.

One illustrative movable mold section 29 shown in the drawings comprises a support plate 32 having a retainer plate 34 secured thereto and defining a central opening 35 in which is positioned a core 36 secured to the retainer plate 34 and extending outwardly therefrom. The exterior end of the core is shaped to define the interior surface of the molded part. A stripper plate 38 is slidably mounted with respect to the retainer and support plates 32, 34, and it is provided with a central annular mold ring 39 defining a stripping lip 40 closely surrounding the core 36.

For heating the core to the desired mold temperature, a heater band 41 is held adjacent to the core base by the retainer plate structure 34. For retaining the heater band and core in the retainer plate, the latter includes an annular retainer ring 42 defining a shoulder 43 adapted to engage and retain a flange 44 on the base of the core. The annular retainer ring further includes an interior recess 45 within which the heater band 41 is supported and retained. When the stripper plate 38 is positioned against the retainer plate 34, the core projects slightly outwardly therefrom to form one-half of the mold.

The second half of the mold is defined by the relatively stationary portion 30 of the mold assembly 20. This portion of the mold includes an outer support sleeve 46 supported on the guide rails 25 and mounting, at its forward end, a mold plate 47 having a central aperture 48 in which is positioned the stationary mold defining body 49 which cooperates with the core on the movable side 29 of the mold to form the mold cavity 28.

The mold body 49 is formed by a central body member 50 defining a portion of the mold cavity and having a sprue gate 51 extending therethrough. Surrounding the mold body member 50 is an annular mold ring 52 which includes an interior ring 54, the inner portion of which defines the outer peripheral walls of the mold cavity 28. For heating the mold cavity, a heater band 55 is provided in the annular mold ring surrounding the interior ring 54 thereof.

The configuration of the cavity as defined by the mold body 50 and core 36 will be determined by the shape of the product to be molded. The mold core and body sections, when positioned together, define a mold cavity 28 having the desired shape. When so positioned, molding powder is injected into the cavity 28 through the sprue gate 51 which is provided with an internal axial passage 56 opening into the mold cavity 28. For injecting the molding powder, a movable runner plate 58, carrying a nozzle 59 having an axial passage 60 which is axially aligned with the passage 56 in the sprue gate, is provided with a powder passage 61 communicating with the molding powder injection assembly 21. With this construction, powder flows from the fluidizing system 21 through the passage 60 and, thence, into the sprue gate 51 and sprue passage 56 into the mold cavity 28. After the mold cavity is filled, the moving runner plate and powder injection system is retracted, to prevent the powder from sintering or curing in the runner system, and the molding powder in the cavity is allowed to cure. It should be noted that the sprue gate passage 56 is tapered to enlarge or increase in diameter in the direction of flow so that any molding powder which cures and solidifies is readily withdrawn from the passage prior to the next injection. The configuration of the mold cavity and the associated mold structure will be determined by the shape of the particular product being molded.

Molding powder to be injected into the mold cavity 28 is entrained in a stream of air before feeding through the various passages into the sprue gate 51. For this purpose, the molding powder entrainment assembly 21 receives molding powder from a hopper 65 and compressed air from an air input conduit 66. The air and powder are mixed in a conical chamber 68 defined in an injection cylinder 69. The air is fed into the conical chamber 68 through a distributor plate 70 having spirally inclined air inlet passages or cyclone holes 71. The powder is fed to the conical chamber 68 through an inlet port 72 near the base of the chamber 68. Chamber 68 has an axis 73. The powder is picked up and entrained by the spiraling airstream which results in a fluidized stream of powder which is then fed through an outlet 74 at the apex of the conical chamber 68. The outlet 74 opens into the central passage 75 of an injection tube 76, leading to the runner plate passage 61 in the runner plate 58. The injection tube 75 is supported on the runner plate by a tube support 78. The powder entrainment mechanism may move together with the runner plate or the injection tube may be flexible so that the powder entrainment section 21 may be stationarily supported on the apparatus.

For providing a controlled moisture content to the entrained powder in order to maintain a uniform particle distribution, a small, mist forming, quantity of water is injected into the airstream in conduit 66. That is, the incoming air may be humidified by any conventional means.

The powder injection system 21 provides a fluidized stream of the molding powder. The powder particles are picked up and entrained in the spirally moving flow of air which provides a swirling effect serving to thoroughly mix and entrain the powder particles in the airstream. The powder injection system is essentially self-metering. When a mold cavity is filled with molding powder at a given air pressure, no further powder can be introduced into the cavity and any excess powder simply remains in the conical chamber for the next injection. During the injection of powder into a mold cavity, it may be desirable to close the port opening from the hopper into the conical entrainment chamber. An appropriate valve means may be utilized or, alternatively, the hopper 65 may be mounted adjacent an aperture 80 in a sleeve 81, which sleeve 81 slides along the surface of the entrainment chamber body 69 to close the port 72 during the injection process. In this manner, by mounting the conical mixing chamber on apertured sleeve 81, a valve-like cutoff is provided when the sleeve is displaced from the passage 72 in the mixing chamber housing 69. If needed, the various components of the injection system may be cooled to prevent the molding powder from solidifying in the injection tube passages.

Following the initial molding operation, the movable section of the mold apparatus is partially separated from the stationary section and the molded part is allowed to cool in order to increase its rigidity before further handling. This can be accomplished by allowing the part to air cool or, alternatively, by directing jets (not shown) of a stream of a cooling medium such as cold air onto the molded product. After cooling, the mold elements are further separated and the stripper plate is actuated to strip the molded part from the core. The molded part falls out of the apparatus and is collected in a bin or hopper (not shown).

When the molded part is only partially cured in the molding apparatus, each molded part is placed on a correspondingly shaped mandrel and then heated in an oven maintained at a temperature sufficient to provide the desired cure without fusing or glazing the product. The oven curing temperature is selected according to the polymer from which the product is manufactured. For the ultra-high molecular weight polyethylene polymer, referred to herein, the curing temperature would be approximately 300° C. to 325° C. The oven may be continuous or batch in operation.

Products produced by the present invention are useful in a variety of applications. Notable are the water filter referred to above, and gas filters such as filters for cigarettes. The products of this invention have a porosity which is uniformly predictable throughout the product which thereby results in a uniform flow of material through the filter without channeling. This increases the life and utility of the filter. The filter further is easily formed and the method is well adapted to mass production techniques.

A representative water filter element 90 is shown in FIGS. 4 and 5. The filter is formed with a ribbed side wall 90 and bottom wall 92 and with an upper annular flange 93. Its utility and a detailed description is set forth in the aforementioned application Ser. No. 814,485.

An illustrative cigarette filter 95 is shown in FIG. 6. In the configuration shown, the filter is a generally cylinderically cup-shaped tube shaped with a tubular exteriorally ribbed sidewall 96 closed by a bottom panel 97 at one end and provided with an annular flange 98 at its other end. The wall thicknesses are calculated to provide uniform air flow through the filter when inserted in the mouthpiece end of a cigarette. During the molding operation, aromatic flavoring ingredients may be added to the moisturized molding powder before injection into the mold.

It will be further appreciated that, by heating local sections of the mold cavity, portions of the surface of the molded articles may be selectively fused to an impervious state. In this manner, because of the uniformly controlled porosity of the molded product, fluid flow therethrough can be readily directed into desired channels.

While an illustrative embodiment of an apparatus of the present invention has been described in considerable detail, it should be understood that there is no intention to limit the claims to the specific form disclosed. On the contrary, it is the intention to cover all modifications, equivalents, alternatives and uses of the present invention falling within the spirit and scope of the invention as expressed in the appended claims.

We claim:

1. Apparatus for forming a fluidized stream of moldable plastic powder and air for injection into a mold comprising:

means defining a conical chamber having an outlet passage at the apex thereof;

means defining an aperture in the conical side of said chamber adjacent to the base thereof for receiving powder to be entrained in an airstream;

means for introducing air at the base of said conical chamber in a swirling stream for entraining and fluidizing plastic powder particles and conveying said particles in a fluidized airstream through said outlet passage;

a mold cavity having an inlet coupled to receive said fluidized airstream from said outlet passage;

and means for introducing water in a controlled amount into said air for moisturizing said fluidized plastic powder airstream.

2. Apparatus for molding a polymeric high-molecular weight plastic powder into a shaped porous product, comprising:

a housing defining a conical chamber;

an outlet passage extending outwardly of said chamber from the apex thereof;

means defining an aperture in the conical sidewall of said chamber adjacent to the base thereof;

means storing a supply of said powder and including an outlet therefor communicating with said aperture for the delivering of said powder into said chamber;

a source of compressed air;

means defining a circumferentially-spaced succession of air nozzles in the base of said chamber, each nozzle being coupled to said source and inclined with respect to the axis of said chamber, for producing a swirling airstream within said chamber which entrains said powder delivered through said aperture and thereby creating a fluidized powder airstream flowing through said outlet passage;

a mold cavity;

a nozzle passage coupled between said outlet passage and said mold cavity for conveying said fluidized powder airstream into and filling said mold cavity with said powder;

and means for maintaining said mold cavity at a temperature and for a period of time sufficient to at least partially cure said particles, without melting said particles, into a formed shape as defined by said mold cavity and yet with a substantially uniform and pre-selected degree of porosity substantially throughout said formed shape.

3. Apparatus as defined in claim 2 which further includes means for introducing humidifying water into said air to moisturize said fluidized powder airstream and maintain a substantially uniform distribution of particles of said powder within said airstream.

4. Apparatus as defined in claim 2 which further includes means for decoupling said nozzle passage from said outlet passage after said mold cavity is filled and during the maintaining of said temperature to cure said particles.

* * * * *